United States Patent

Uchidate (10) Patent No.: US 10,580,180 B2
(45) Date of Patent: Mar. 3, 2020

(54) COMMUNICATION APPARATUS, HEAD MOUNTED DISPLAY, IMAGE PROCESSING SYSTEM, COMMUNICATION METHOD AND PROGRAM

(71) Applicant: CANON KABUSHIKI KAISHA, Tokyo (JP)

(72) Inventor: Hikaru Uchidate, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 15/572,906

(22) PCT Filed: Jun. 14, 2016

(86) PCT No.: PCT/JP2016/002858
§ 371 (c)(1),
(2) Date: Nov. 9, 2017

(87) PCT Pub. No.: WO2017/010038
PCT Pub. Date: Jan. 19, 2017

(65) Prior Publication Data
US 2018/0114350 A1    Apr. 26, 2018

(30) Foreign Application Priority Data

Jul. 15, 2015   (JP) .................. 2015-141596

(51) Int. Cl.
*G06T 11/60* (2006.01)
*H04N 21/234* (2011.01)
(Continued)

(52) U.S. Cl.
CPC .............. *G06T 11/60* (2013.01); *G09G 3/20* (2013.01); *G09G 5/00* (2013.01); *G09G 5/377* (2013.01);
(Continued)

(58) Field of Classification Search
CPC . G06T 11/60; G09G 3/20; G09G 5/00; G09G 5/377; H04N 13/239; H04N 13/344; H04N 21/234; H04N 21/236; H04N 21/26216; H04N 21/41; H04N 7/08; H04N 7/025; H04N 7/083; H04N 5/66
See application file for complete search history.

(56) References Cited

U.S. PATENT DOCUMENTS 6,549,641 B2    4/2003   Ishikawa et al.
2002/0075286 A1*  6/2002   Yonezawa ............ H04N 13/398
                                                           345/679
(Continued)

FOREIGN PATENT DOCUMENTS

JP    H09-168133 A    6/1997
JP    2005-027121 A   1/2005
JP    3724157 B2      12/2005

OTHER PUBLICATIONS

English Translation of JP 09168133.*
(Continued)

*Primary Examiner* — Hong Zhou
(74) *Attorney, Agent, or Firm* — Venable LLP (57) ABSTRACT

A communication apparatus includes at least one processor executing instructions to operate as an obtaining unit to obtain first video data including repetition of an effective interval in which frame image data of a first video is input and an interval in which image data is not input, second video data comprising repetition of an effective interval in which frame image data of a second video is input and an interval in which frame image data is not input, and communication data other than the video data. Instructions are also executed to operate as a setting unit to set a method of multiplexation of the first video data, the second video data, and the communication data in accordance with the effective interval of the first video data and the effective interval of the second video data, and a transmission unit to transmit data multiplexed in accordance with the set method of multiplexation.

18 Claims, 8 Drawing Sheets

(51) Int. Cl.
  *H04N 21/236* (2011.01)
  *H04N 21/262* (2011.01)
  *H04N 13/239* (2018.01)
  *G09G 5/00* (2006.01)
  *G09G 5/377* (2006.01)
  *G09G 3/20* (2006.01)
  *H04N 7/083* (2006.01)
  *H04N 21/41* (2011.01)
  *H04N 7/08* (2006.01)
  *H04N 13/344* (2018.01)

(52) U.S. Cl.
  CPC ............... *H04N 7/08* (2013.01); *H04N 7/083* (2013.01); *H04N 13/239* (2018.05); *H04N 13/344* (2018.05); *H04N 21/234* (2013.01); *H04N 21/236* (2013.01); *H04N 21/26216* (2013.01); *H04N 21/41* (2013.01)

(56) References Cited

U.S. PATENT DOCUMENTS

| 2003/0032392 | A1* | 2/2003 | Suzuki | H04N 7/083 |
| | | | | 455/39 |
| 2008/0266386 | A1* | 10/2008 | Maeda | G06F 3/012 |
| | | | | 348/47 |
| 2009/0179824 | A1* | 7/2009 | Tsujimoto | G02B 27/0025 |
| | | | | 345/7 |
| 2012/0155772 | A1* | 6/2012 | Yamakawa | G06T 7/246 |
| | | | | 382/190 |

OTHER PUBLICATIONS

Notification of Transmittal of the International Search Report and the Written Opinion dated Aug. 23, 2016, in International Application No. PCT/JP2016/002858.

\* cited by examiner

| Mode 0 | Mode | SYNCHRO-NIZATION SIGNAL | SECOND DATA FOR MULTIPLEXING | FIRST DATA FOR MULTIPLEXING |

[Fig. 6B]

| Mode 1 | Mode | SYNCHRO-NIZATION SIGNAL | THIRD DATA FOR MULTIPLEXING | FIRST DATA FOR MULTIPLEXING |

[Fig. 6C]

| Mode 2 | Mode | SYNCHRO-NIZATION SIGNAL | SECOND DATA FOR MULTIPLEXING | THIRD DATA FOR MULTIPLEXING |

[Fig. 6D]

| Mode 3 | Mode | SYNCHRO-NIZATION SIGNAL | THIRD DATA FOR MULTIPLEXING |

COMMUNICATION APPARATUS, HEAD MOUNTED DISPLAY, IMAGE PROCESSING SYSTEM, COMMUNICATION METHOD AND PROGRAM

TECHNICAL FIELD

The present invention relates to a communication apparatus, a head mounted display, an image processing system, a communication method and a program.

BACKGROUND ART

In recent years, a mixed reality or so-called MR technique has been known as a technique for blending the physical world and a virtual world in real time and seamlessly. One known MR technique is a technique in which a HMD apparatus user views a synthesized video in which CG (Computer Graphics) is superimposed on a captured video that is captured by a video camera utilizing a video see-through HMD (Head Mounted Display). This captured video is captured so to include a subject approximately matching a subject viewed from a pupil position of the HMD apparatus user. The generation of a synthesized video can be performed by an external server capable of communication with the HMD, and in such cases, the captured video is transmitted from the HMD to the server, and the synthesized video is transmitted from the server to the HMD.

Also, an HMD system mounting a sensor that detects a movement of the head in order to display CG appropriately in correspondence with the movement of the head of the HMD apparatus user is known (Japanese Patent No. 3724157). In such a system, in addition to the captured video, other communication data (data of the sensor that detects the movement of the head, for example), is transmitted from the HMD to the server.

SUMMARY OF INVENTION

According to an embodiment of the present invention, a communication apparatus comprises: an obtaining means for obtaining first video data comprising repetition of an effective interval in which frame image data of a first video is input, and an interval in which frame image data is not input, and communication data other than the video data; a setting means for setting a method of multiplexation of the first video data and the communication data in accordance with whether or not in the effective interval of the first video data; and a transmission means for transmitting data multiplexed in accordance with the set method of multiplexation.

According to another embodiment of the present invention, a head mounted display comprises the communication apparatus according to an embodiment, the head mounted display comprising: an image capture means for capturing the first video and the second video; a reception means for receiving a synthesized video generated using the first and the second video from an image processing apparatus; and a display means for displaying the synthesized video, wherein the communication apparatus transmits the multiplexed data to the image processing apparatus.

According to still another embodiment of the present invention, an image processing system comprises: a head mounted display according to an embodiment; and an image processing apparatus for receiving the multiplexed data from the head mounted display, for generating the synthesized video using the first and the second video, and for transmitting the synthesized video to the head mounted display.

According to yet another embodiment of the present invention, a communication method comprises: obtaining first video data comprising repetition of an effective interval in which frame image data of a first video is input, and an interval in which frame image data is not input, and communication data other than the video data; setting a method of multiplexation of the first video data and the communication data in accordance with whether or not in the effective interval of the first video data; and transmitting data multiplexed in accordance with the set method of multiplexation.

According to still yet another embodiment of the present invention, a program comprises an instruction for causing a computer to function as each means of the communication apparatus according to an embodiment.

Further features of the present invention will become apparent from the following description of exemplary embodiments (with reference to the attached drawings).

DESCRIPTION OF EMBODIMENTS

It is necessary to transfer communication data with a captured video within the range of a bandwidth of a transmission channel from an HMD to an external device. For this reason, in a conventional HMD system, in a case that the bandwidth of the transmission channel exceeds a sum total of the data amount of the communication data and a data amount of the captured video, it is necessary to cause a decrease in the data amount (such as a bit rate) of the communication data or the captured video which leads to a decrease in quality of a synthesized video.

One embodiment of the present invention effectively uses the bandwidth when transmitting both the communication data and the captured video to achieve suppression of the decrease in the quality of transmission.

First Embodiment

Figure 1:
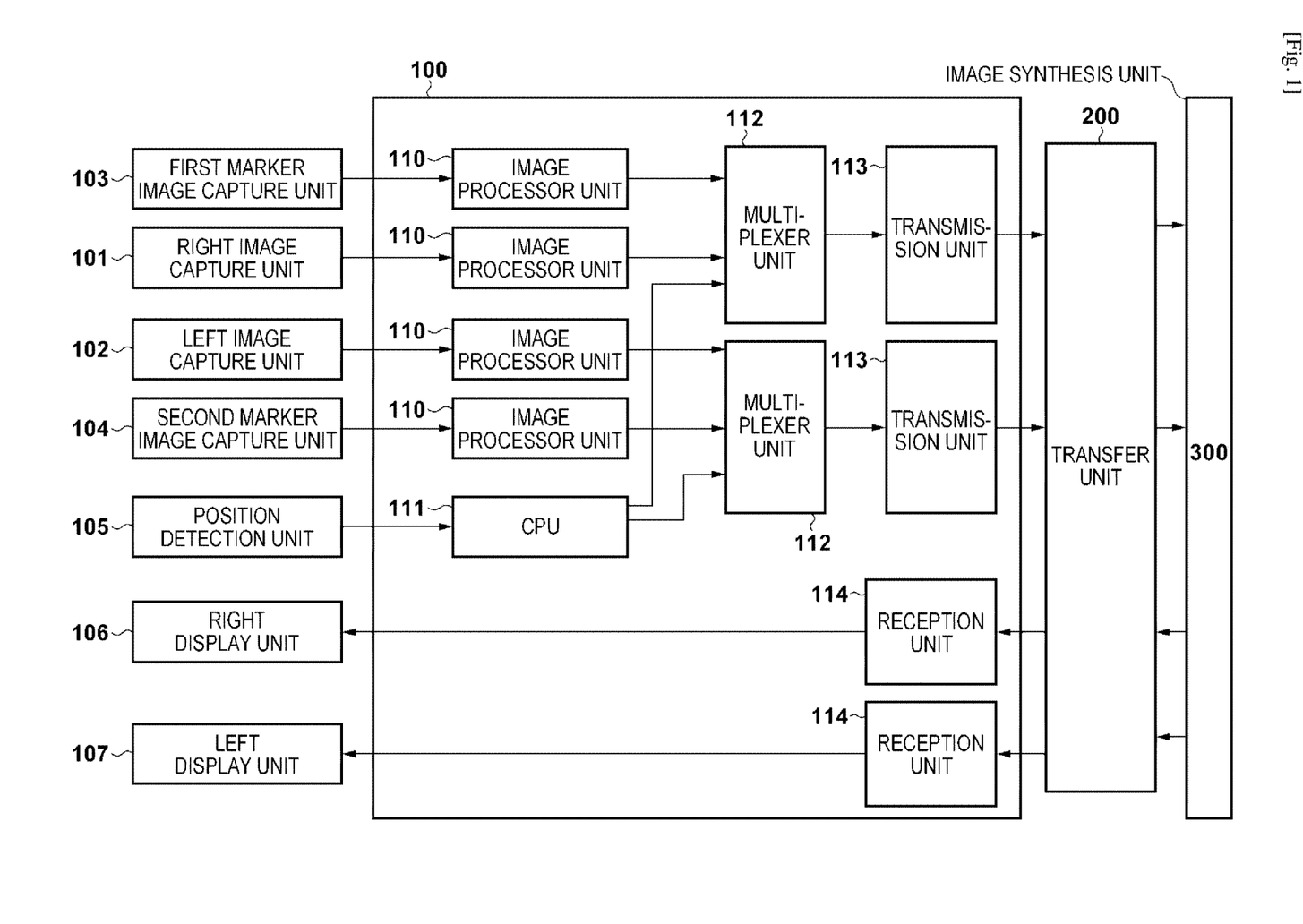
FIG. 1 is a block diagram for illustrating an example configuration of an image processing system according to a first embodiment.

FIG. 1 illustrates a configuration of the image processing system according to a first embodiment. As illustrated by FIG. 1, the image processing system is equipped with a head mounted display (hereinafter, HMD) 100, a transfer unit 200, and an image synthesis unit 300. The HMD 100 transfers an inputted plurality of items of the communication data and video data as a multiplexed signal to the image synthesis unit 300 and displays the video data received from the image synthesis unit 300. The image synthesis unit 300 generates CG data in accordance with the contents of the video data received by the HMD 100 and transfers the generated CG data superimposed onto the video data to the HMD 100. The transfer unit 200 connects the image synthesis unit 300 to the HMD 100, transfers the multiplexed signal from the HMD 100 to the image synthesis unit 300, and transfers the video data from the image synthesis unit 300 to the HMD 100. Here, the HMD 100 is not limited to a head mounted display in a narrow sense and any head mounted apparatus is possible.

By mounting the HMD 100 to his or her head, it is possible for a user to view a video in which CG is superimposed onto a video of the external world, and it is possible to have an experience of a mixed reality of the physical world and a virtual world blended together in real time. To the HMD 100, an external apparatus such as a right image capture unit 101, a left image capture unit 102, a first marker image capture unit 103, a second marker image capture unit 104, a position detection unit 105, a right display unit 106, and a left display unit 107 are connected.

The right image capture unit 101 and the left image capture unit 102 are aligned to a line of sight direction of the user and are attached to the HMD 100. The right image capture unit 101 and the left image capture unit 102 can capture video of the external world. The first marker image capture unit 103 and the second marker image capture unit 104 also can capture video of the external world. The first marker image capture unit 103 and the second marker image capture unit 104 are attached to the HMD 100 for capturing symbols (hereinafter, MR markers) arranged in the external world. The video data captured by the first marker image capture unit 103 and the second marker image capture unit 104 are transferred to the image synthesis unit 300 which is described later, and are used for determining a superimposition position of a virtual image onto the video captured by the right image capture unit 101 and the left image capture unit 102. For example, the image synthesis unit 300 can perform position detection of an MR marker from the video data and ID information detection of the MR marker. It generates position/orientation data of the HMD 100 in accordance with the position where the MR marker is detected and the ID information of the MR marker. Then, a selection of the CG data to be superimposed on the video captured by the right image capture unit 101 and the left image capture unit 102 and a determination of the superimposition position is performed in accordance with the generated position/orientation data of the HMD 100.

For example a CMOS image sensor or the like can be used as the right image capture unit 101, the left image capture unit 102, the first marker image capture unit 103, the second marker image capture unit 104, and the like. The same image sensor may be used for the right image capture unit 101, the left image capture unit 102, the first marker image capture unit 103, and the second marker image capture unit 104, and image sensors in which at least one of resolution or framerate differs may be used. In the present embodiment, the image sensors used in the right image capture unit 101 and the left image capture unit 102 use the frame rate and the resolution different from the image sensors used in the first marker image capture unit 103 and second marker image capture unit 104.

The position detection unit 105 is something which detects at least one of an orientation or a position of the head of the user on which the HMD 100 is mounted or of the HMD 100, and for example, a gyro sensor, an accelerometer, a geomagnetic sensor, and the like can be used. Hereinafter, at least one of an orientation or a position will be referred to as position/orientation data. Note, the orientation also includes a direction of the HMD 100. In one embodiment, the position detection unit 105 generates position/orientation data including both the orientation and the position. Data that the position detection unit 105 detected can be transferred to the image synthesis unit 300 via the transfer unit 200 and used for adjusting a CG superimposition position. Data that the position detection unit 105 detected, for example, can be used as an initial value of the position/orientation data. Specifically, an MR marker image may be projected onto the captured images of the first marker image capture unit 103 and the second marker image capture unit 104 based on the initial value of the position/orientation data, and the position/orientation data may be obtained by an iterative calculation so as to minimize and error thereof. Also, data that the position detection unit 105 detected, in a case in which an MR marker is not within a capturing range of the first marker image capture unit 103 and the second marker image capture unit 104, can be used for adjusting the CG superimposition position.

The right display unit 106 and the left display unit 107 provide the video to the user on which the HMD 100 is mounted, and for example an organic EL panel, a liquid crystal panel, or the like can be used. The video synthesized by the image synthesis unit 300 is provided to the user by the video being transferred to the HMD 100 through the transfer unit 200, and the right display unit 106 and the left display unit 107 displaying the video.

Next, an internal configuration of the HMD 100 will be described. The HMD 100 contains image processor units 110, a CPU 111, multiplexer units 112, transmission units 113, and reception units 114. Video signals input to the HMD 100 from the right image capture unit 101, the left image capture unit 102, the first marker image capture unit 103, and the second marker image capture unit 104 are input to the multiplexer unit 112 via each image processor unit 110.

The image processor units 110 perform image processing (such as color interpolation processing, white balance processing, and gamma correction processing for example) according to each image capturing device corresponding to the video signal inputted.

The image capture units 101-104 generate video data configured by a plurality of frame images by capturing consecutive frame images. For this reason, the video data input to the image processor units 110 is configured by repetition of an interval in which the frame image data is not input and an effective interval in which the frame image data is input.

The CPU 111 is an arithmetic processing apparatus which generates the communication data communicated to the image synthesis unit 300 based on the position/orientation data obtained from the position detection unit 105. The generated communication data is transmitted to the multiplexer unit 112. In this way, in one embodiment, information is included indicating at least one of an orientation or a position of the HMD 100 in the communication data transmitted to the image synthesis unit 300 from the HMD 100. However, the data that is inputted to the CPU 111 and transmitted to the image synthesis unit 300 is not limited to the position/orientation data. For example, the CPU 111 may connect to an external apparatus other than the position detection unit 105, able to obtain data such as voice data, GPS information, or temperature/humidity information. The CPU 111 generates communication data based on this data and can transmit to the image synthesis unit 300.

The multiplexer units 112 time-division-multiplex input data of a sum total of three systems of the video data from the right image capture unit 101 (or the left image capture unit 102), the video data from the first marker image capture unit 103 (or the second marker image capture unit 104), and the communication data from the CPU 111. One transfer signal generated by time division multiplexing is transmitted to the transmission units 113. In the present embodiment, although the video data from the right image capture unit 101 and the video data from the first marker image capture unit 103 is input into a multiplexer unit 112, the configuration is not limited to this. For example, the video data may be input to the same multiplexer unit from the image capture units 101-104.

The transmission units 113 are communication interfaces having a function to transmit a digital signal multiplexed by a multiplexer units 112 to the image synthesis unit 300 via the transfer unit 200. For example PCI-express, LAN, or another high speed serial communication can be used as the communication interface. The reception units 114 receive a video data signal from the image synthesis unit 300 via the transfer unit 200. The video data signal received by the reception units 114 is transmitted to the right display unit 106 and the left display unit 107 and displayed by the display units 106 and 107. The above described multiplexer units 112, transmission units 113, and reception units 114 may function as communication apparatuses.

The image synthesis unit 300 receives the multiplexed data transmitted from the HMD 100. Then, the image synthesis unit 300 demultiplexes the received multiplexed data, the video data from the right image capture unit 101 (or the left image capture unit 102), the video data from the first marker image capture unit 103 (or the second marker image capture unit 104), and the communication data from the CPU 111. Then the image synthesis unit 300 generates synthesized video using the video data from the right image capture unit 101 (or the left image capture unit 102), and the video data from the first marker image capture unit 103 (or the second marker image capture unit 104). For example, the CG is superimposed on the video data from the right image capture unit 101 (or the left image capture unit 102) based on the demultiplexed data. Then, the image synthesis unit 300 transmits synthesized video data in which the CG is superimposed to the HMD 100 via the transfer unit 200 once again. The image synthesis unit 300 may be a separate information processing apparatus from the HMD 100.

With such a configuration, the video data captured by the image capture units 101-104 attached to the HMD 100 is transferred to the image synthesis unit 300 via the transfer unit 200 in the system of FIG. 1. Then, the virtual image (the CG data for example) is synthesized with the video data based on the position/orientation data and an MR marker position detected based on the video data. The synthesized video data, in which the CG data is synthesized, is transmitted to the HMD 100 via the transfer unit 200 once again, and is displayed on the display units 106 and 107. In this way, mixed reality, in which the physical world and the virtual world are blended in real time, can be provided to the user.

(Description of the Multiplexer Unit 112)

Figure 2:
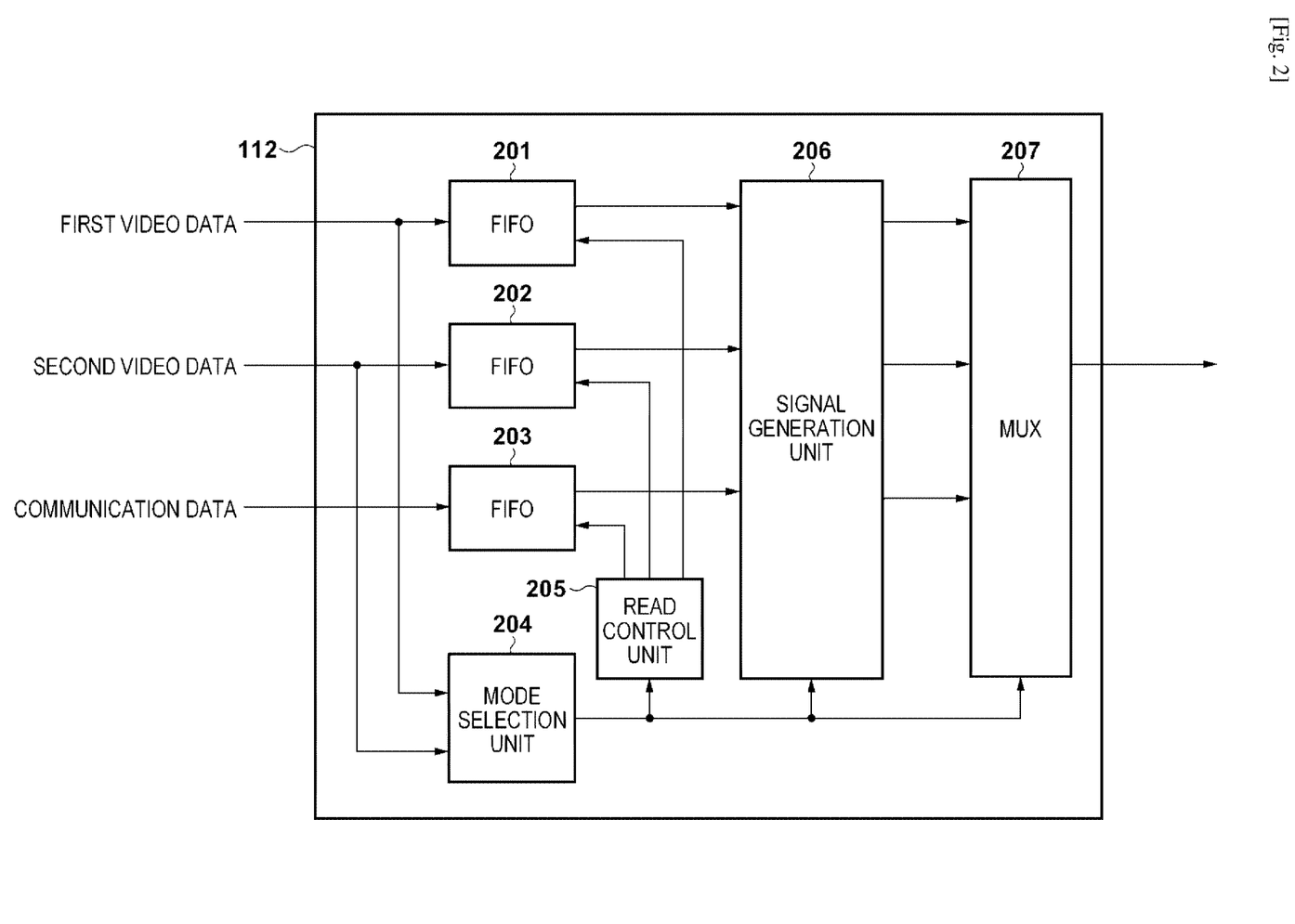
FIG. 2 is a block diagram for illustrating an example configuration of a multiplexer unit 112 in FIG. 1.

Next, a configuration of the multiplexer unit 112 will be described in detail. FIG. 2 is a detailed block diagram of the multiplexer unit 112. Hereinafter, the video data from the right image capture unit 101 (or the left image capture unit 102) will be referred to as a first video data and the video data from the first marker image capture unit 103 (or the second marker image capture unit 104) will be referred to as a second video data. Also, the video data, in addition to image information, includes a horizontal synchronizing signal and a vertical synchronizing signal indicating an initiation of the video, and an effective interval signal indicating the effective interval. The effective interval signal indicates whether video data including these signals is data in the effective interval in which the frame image data is input or data in the interval in which the frame image data is not input. The video data in the effective interval includes the frame image data, and the video data outside of the effective interval does not include the frame image data.

The multiplexer unit 112 as illustrated in FIG. 2 contains FIFO buffers (First In First Out, hereinafter referred to simply as FIFO) 201-203 which store communication data, first video data, and second video data respectively. The multiplexer unit 112 additionally contains a mode selection unit 204, a read control unit 205, a signal generation unit 206, and an MUX unit 207.

The FIFOs 201-203 are buffers which store the communication data or the video data. The data is stored in the FIFOs 201-203 in the effective interval, and the stored data is output by an input order in accordance with a read signal issued by the read control unit 205. As described above, the FIFO 201 obtains the first video data through repetition of the effective interval in which the frame image data of the first video is input, and the interval in which the frame image data is not input. Also, the FIFO 202 obtains the second video data through repetition of the effective interval in which the frame image data of the second video is input, and the interval in which the frame image data is not input. Additionally, the FIFO 203 obtains the communication data, which is not video data.

The mode selection unit 204 sets a method of multiplexation for the first video data, the second video data and the communication data in accordance with whether or not there is an effective interval of the first video data and whether or not there is an effective interval of the second video data. The mode selection unit 204 in the present embodiment selects a multiplexation mode in accordance with the effective interval signal of the first video data and the effective interval signal of the second video data. The mode selection unit 204 can determine whether or not there is an effective interval of the video data, currently, based on the effective interval signal.

Figure 3:
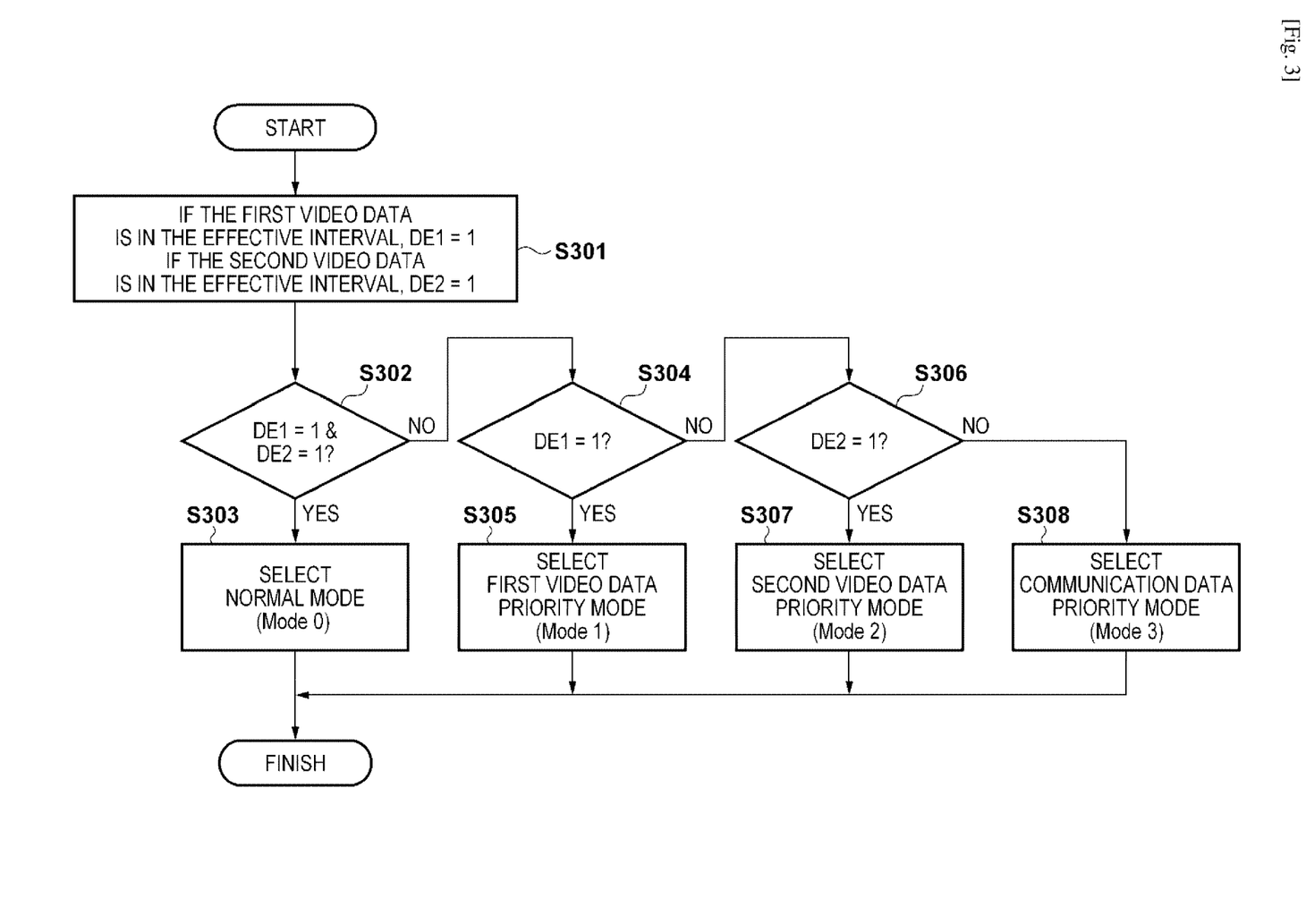
FIG. 3 is a flowchart for illustrating operation of a mode selection unit 204 in FIG. 2.

FIG. 3 is a flowchart illustrating an example of an operation of the mode selection unit 204. The mode selection unit 204 in step S301 sets a variable DE1 to 1 in a case when the first video data is in the effective interval, and sets a variable DE2 to 1 in a case when the second video data is in the effective interval.

The mode selection unit 204 in step S302 determines whether or not the first video data is in the effective interval and the second video data is in the effective interval, and in a case in which this condition is satisfied, the mode selection unit 204 in step S303 selects normal mode (hereinafter, Mode 0). When this is not the case, the mode selection unit 204 in step S304 determines whether or not the first video data is in the effective interval and the second video data is not in the effective interval. If this condition is satisfied, the mode selection unit 204 in step S305 selects a first video data priority mode (hereinafter, Mode 1). When this is not the case, the mode selection unit 204 in step S306 determines whether or not the first video data is not in the effective interval and the second video data is in the effective interval. If this condition is satisfied, the mode selection unit 204 in step S307 selects a second video data priority mode (hereinafter, Mode 2). When this is not the case, in other words in the case in which both the first video data and second video data is not in the effective interval, the mode selection unit 204 in step S308 selects a communication data priority mode (hereinafter, Mode 3). In this way, the mode selection unit 204 switches the multiplexation mode in accordance with whether or not the first video data and second video data are in the effective interval.

As described later, in Mode 1, compared to Mode 0, multiplexing is performed such that a data width of the communication data in the transmitted data becomes larger. Also, in Mode 2, compared to Mode 0, multiplexing is performed such that a data width of the communication data in the transmitted data becomes larger. Also, in Mode 3, compared to Modes 0-2, multiplexing is performed such that a data width of the communication data in the transmitted data becomes larger.

Figure 4:
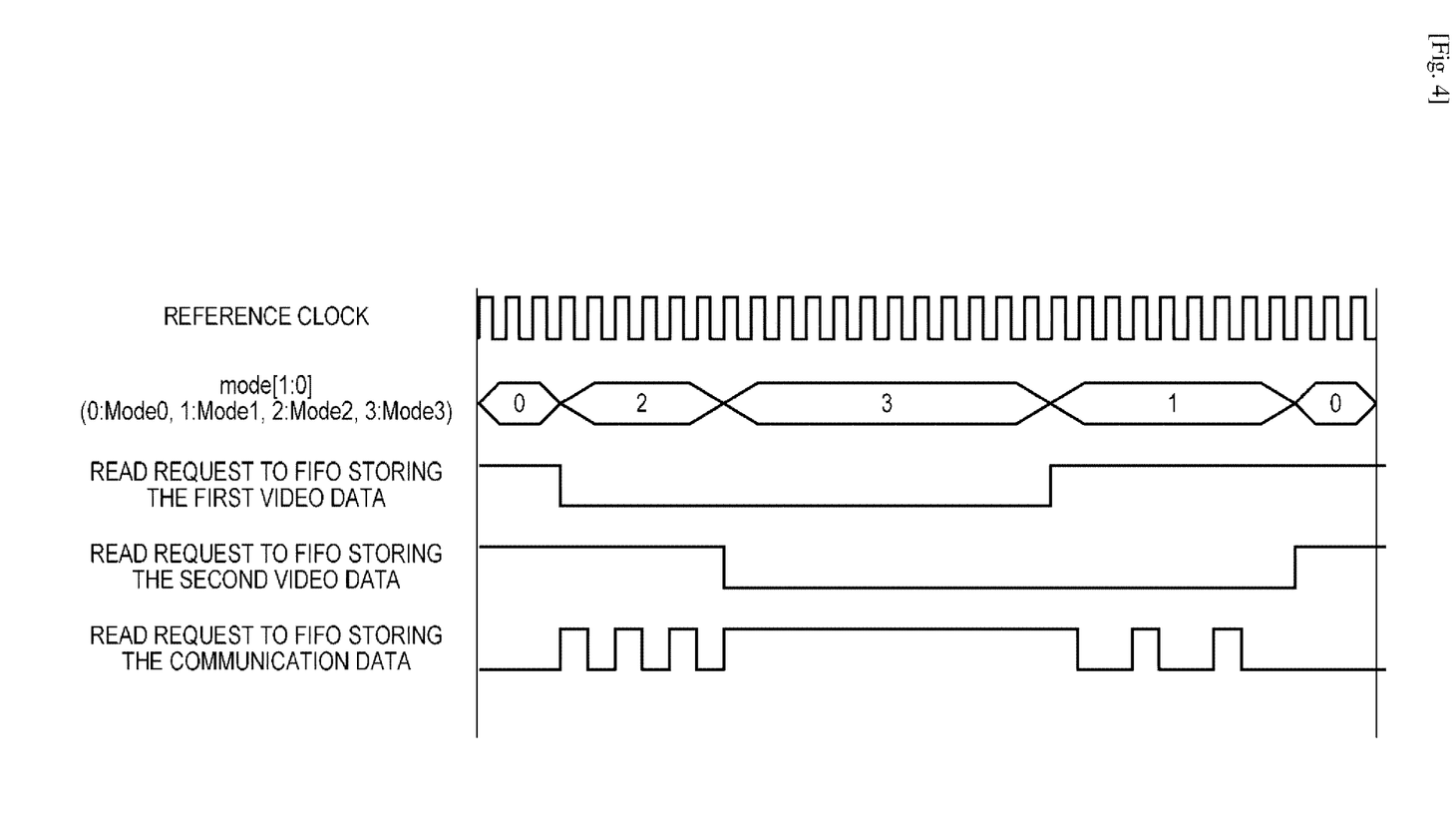
FIG. 4 is a timing chart for describing operation of a read control unit 205 in FIG. 2.

The read control unit 205 performs a read request to the FIFO 201 in accordance with the multiplexation mode. With reference to the timing chart of FIG. 4, an example of operation of the read control unit 205 will be described. In FIG. 4, a reference clock driving the read control unit 205 and a 2 Bit mode signal indicating the multiplexation mode are illustrated. Additionally in FIG. 4, a read request signal to the FIFO 201 which stores the first video data, a read request signal to the FIFO 202 which stores the second video data, and a read request signal to the FIFO 203 which stores the communication data are illustrated.

When the multiplexation mode is Mode 0 or Mode 1 a read request is issued to the FIFO storing the first video data. Also, when the multiplexation mode is Mode 0 or Mode 2, a read request is issued to the FIFO storing the second video data. Meanwhile, the read request to the FIFO storing the communication data is issued during one clock cycle every three reference clock cycles while the multiplexation mode is in Mode 1, and is issued during one clock cycle every two reference clock cycles while in Mode 2. Also, when the multiplexation mode is in Mode 3, the read request to the FIFO storing the communication data is issued every clock cycle of the reference clock. An issuance frequency of the read request to the FIFO storing the communication data is determined in accordance with a multiplexing rate of the communication data in the multiplexed signal generated by the later described MUX unit 207, and will be described later in detail.

The signal generation unit 206 receives a first read data from the FIFO 201 which stores the first video data, second read data from the FIFO 202 which stores the second video data, and third read data from the FIFO 203 which stores the communication data. Then, data for multiplexing which is for generating the multiplexed signal is generated in accordance with the multiplexation mode selected by the mode selection unit 204.

Figure 5:
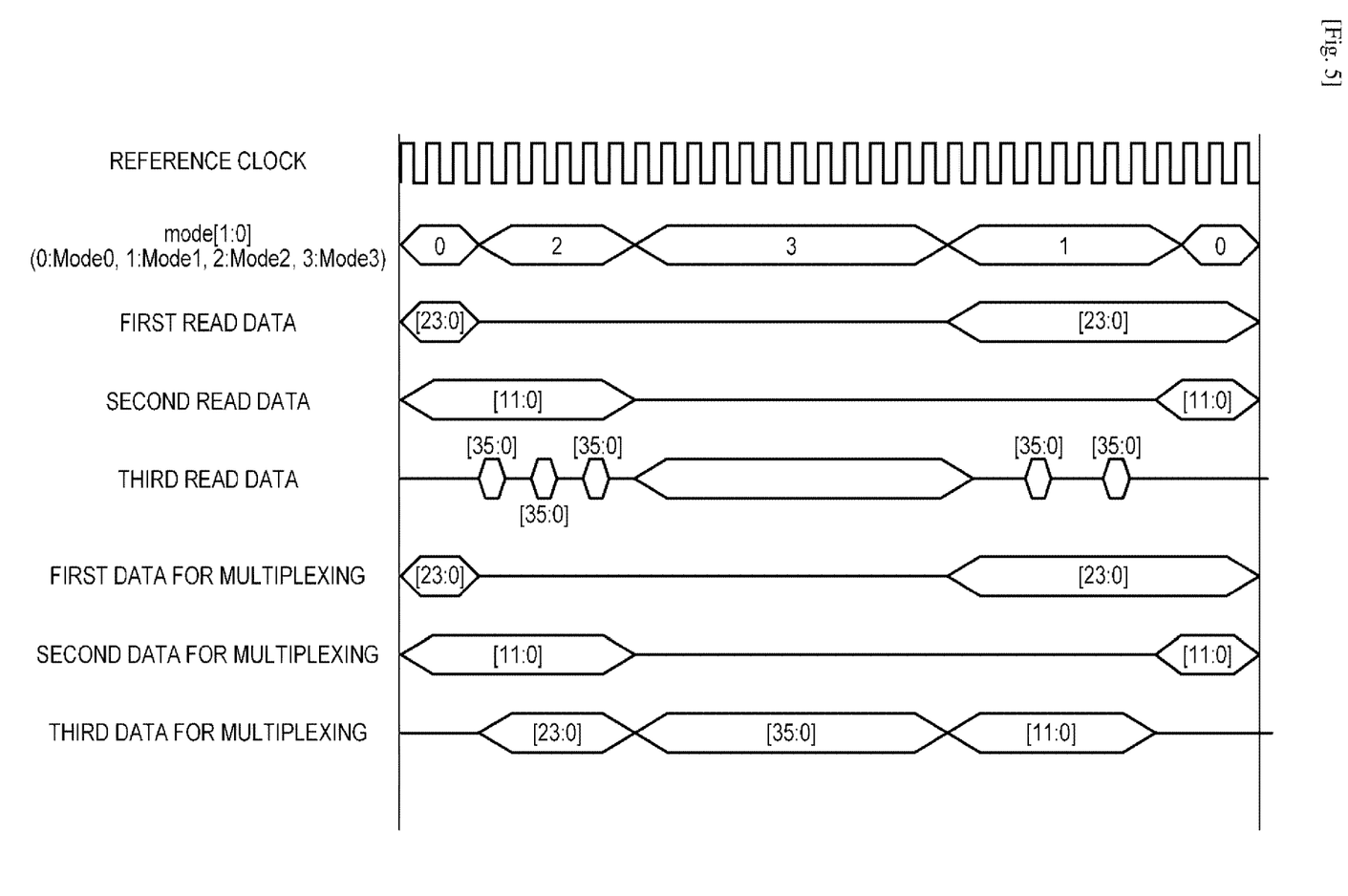
FIG. 5 is a timing chart for describing operation of a signal generation unit 206 in FIG. 2.
Figure 6A:
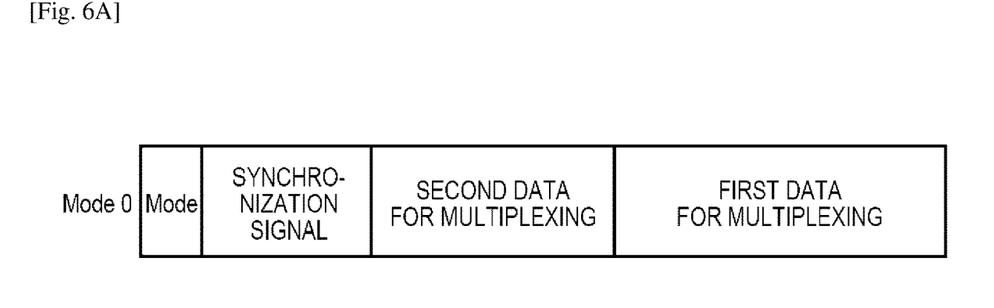
FIG. 6A is a figure for describing a multiplexation operation in a MUX unit 207 in FIG. 2.
Figure 6B:
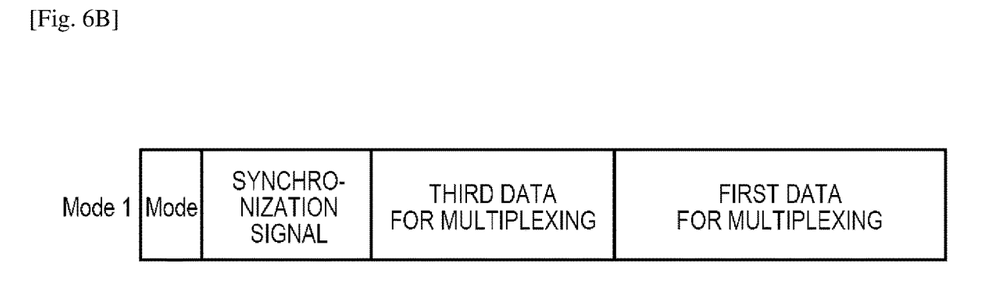
FIG. 6B is a figure for describing a multiplexation operation in a MUX unit 207 in FIG. 2.
Figure 6C:
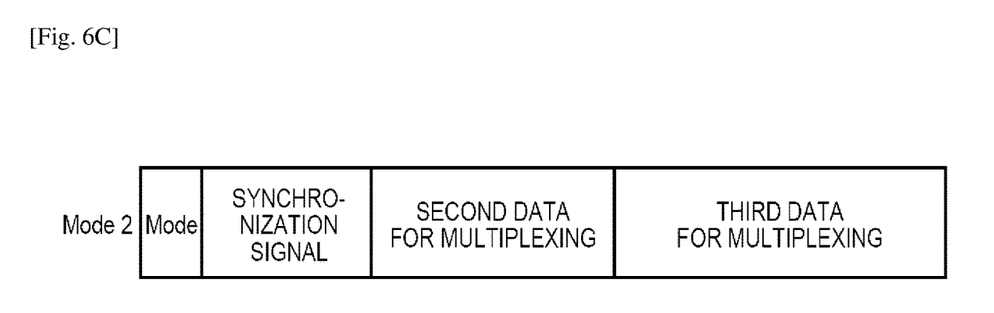
FIG. 6C is a figure for describing a multiplexation operation in a MUX unit 207 in FIG. 2.
Figure 6D:
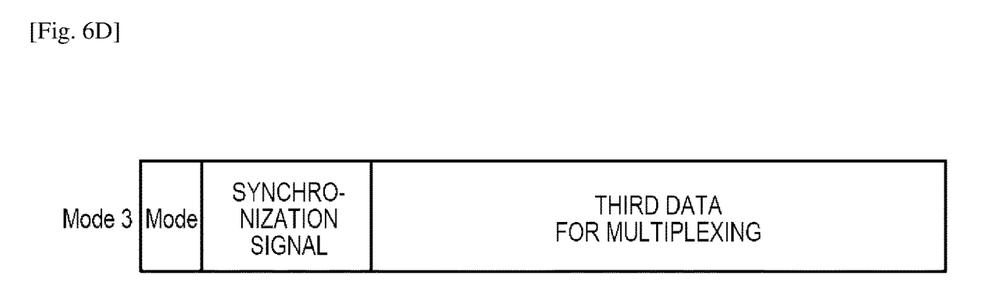
FIG. 6D is a figure for describing a multiplexation operation in a MUX unit 207 in FIG. 2.

With reference to the timing chart of FIG. 5, an example of operation of the signal generation unit 206 is will be described. In FIG. 5, a reference clock driving the signal generation unit 206 and a 2 Bit mode signal indicating the multiplexation mode are illustrated. Additionally in FIG. 5, the first read data, the second read data, and the third read data, as well as first data for multiplexing, second data for multiplexing, and third data for multiplexing generated by the signal generation unit 206 are illustrated.

As described above, in the present embodiment, the frame rate and the resolution differ between the first video data and the second video data. Hereinafter, description is given assuming that a pixel clock of the first video data is 148.5 MHz, and a pixel clock of the second video data is 74.25 MHz. Also, the video data is assumed to be 24 Bits per one pixel. Additionally, it is assumed that with the first read data, information of one pixel is transferred every reference clock cycle (148.5 MHz), and with the second read data, data of one pixel is transferred every two reference clock cycles.

The signal generation unit 206, when in Mode 0 or Mode 1, outputs 24 Bit first read data as the first data for multiplexing. Also, when in Mode 0 or Mode 2, the signal generation unit 206 outputs 12 Bit second read data as the second data for multiplexing.

The third read data is input with a 36 bit width in accordance with a read request to the FIFO which stores the communication data, and time divides in accordance with the multiplexation mode according to the signal generation unit 206. Specifically, the third read data is time divided such that it is a 12 Bit width during Mode 1, a 24 Bit width during Mode 2, and a 36 Bit width during Mode 3, and is output as the third data for multiplexing. The data widths of the third read data and of the third data for multiplexing can be determined arbitrarily. For example, it is possible to determine the data width of the third data for multiplexing such that a sum total of the data width of the first through third data for multiplexing does not exceed a predetermined value. In this way, the signal generation unit 206 generates and outputs the first data for multiplexing, the second data for multiplexing, and the third data for multiplexing in accordance with the multiplexation mode. The data widths of the third read data and of the third data for multiplexing can be determined arbitrarily in accordance with multiplexing rates.

The MUX unit 207 time division multiplexes the first through third data for multiplexing generated by the signal generation unit 206 in accordance with the multiplexation mode. In FIGS. 6A-6D, an example of the multiplexed signal generated by the MUX unit 207 is illustrated for each multiplexation mode. The data illustrated in FIGS. 6A-6D is repeatedly transmitted from the HMD 100 to the image synthesis unit 300. As illustrated in FIGS. 6A-6D, the multiplexed data which is transmitted to the image synthesis unit 300 from the HMD 100 includes a synchronization signal of the first and the second video data, and the information indicating the method of multiplexation. In the present embodiment, the signal indicating the method of multiplexation is a Mode signal indicating the multiplexation mode described above. The synchronization signal of the first and the second video data, for example, may include the horizontal synchronizing signal and the vertical synchronizing signal for the first video data, as well as the horizontal synchronizing signal and the vertical synchronizing signal for the second video data. With such a configuration, asynchronous transmission of the first and the second video data becomes possible. For example, even if the effective intervals of the first and second video data are asynchronous, such as in a case in which the frame rates of the first and second video data are different, transmission of the first and second video data to the image synthesis unit 300 with reduced latency is possible. Also, the multiplexed data includes at least one of the first video data, the second video data, or the communication data. These are selected in accordance with the multiplexation modes.

The multiplexed data multiplexed by the MUX unit 207 in accordance with the method of multiplexation set by the mode selection unit 204 is transferred to the image synthesis unit 300 via the transmission units 113 and the transfer unit 200 previously described. The image synthesis unit 300 can acquire the first video data, the second video data, and the communication data by demultiplexing the received time division multiplexing signal in accordance with the Mode signal. In this way, the MUX unit 207 improves data transfer efficiency by switching a multiplexing format for each multiplexation mode.

In the present embodiment, one out of four types of multiplexation modes is selected, but the configuration is not limited to this. For example, by selecting the communication data priority mode in a case in which neither the first video data nor the second video data is in the effective interval, and by also selecting a video priority mode in other cases, the same effect can be acquired.

In one embodiment, compared to when in the effective interval of the first and the second video data, when not in the effective interval of the first and/or the second video data, the method of multiplexation is set such that the data width of the communication data in the data that is transmitted becomes larger. Also in the example described above, the data width of the communication data is larger when not in the effective interval of the first and/or the second video data (Mode 1-3 illustrated in FIGS. 6B-6D) than when in the effective interval of the first and the second video data (Mode 0 illustrated in FIG. 6A). In Mode 0 illustrated in FIG. 6A, control data is not inserted in order to simplify the explanation, but if the data width that can be transmitted is larger than the sum total of the data widths of the first and the second video data, communication data may be inserted into the remaining portion.

In one embodiment, in at least one period, an effective period of the first video and an effective period of the second video are non-aligned. For example, the frame rate of the first video and the frame rate of the second video may become different, and in this case, there is no synchronization between the effective period of the first video and the effective period of the second video. Also, even if the frame rate of the first video and the frame rate of the second video are the same, the initiation of the effective period of the first video and the initiation of the effective period of the second video can be shifted. By virtue of such configuration, compared to a case in which the effective period of the first video and the effective period of the second video are aligned, an interval of the case when not in the effective interval of the first and/or second video data (Mode 1-3) becomes shorter. For this reason, a decrease in transmission latency of the communication data becomes possible.

As explained above, in the present embodiment, the multiplexation mode is switched in accordance with whether or not the first video data and second video data are in the effective interval. In this way, when the video data and the communication data are multiplexed, the ratio that the communication data occupies the multiplexed data while not in the effective interval of the video data is caused to increase. Thus, even if there is a case in which the resolution or the framerate of the plurality of items of video data is different, it is possible to perform high efficiency data transfer such that lowering of a bit rate or a transmission amount of the communication data and the video data can be suppressed. For this reason, even in a data transfer requested in a real-time nature, it becomes possible to communicate without lowering the quality of the video and with suppressed latency.

In the present embodiment described above, the HMD 100 transmits the first video data, the second video data, and the communication data to the image synthesis unit 300. However, the method of the present embodiment can also be applied in a case in which the HMD 100 transmits the first video data and the communication data. Such a case, the FIFO 201 obtains the first video data through repetition of the effective interval in which the frame image data of the first video is input, and the interval in which the frame image data is not input. Also, the FIFO 203 obtains the communication data, which is not video data. Then, the mode selection unit 204 sets the method of multiplexation of the communication data and the first video data in accordance with whether or not it is an effective interval of the first video data. By virtue of such configuration, the multiplexation mode is switched in accordance with whether or not the first video data is in the effective interval. For this reason, it is possible to perform a data transfer with higher efficiency when the video data and the communication data are multiplexed, because the ratio that the communication data occupies the multiplexed data while not in the effective interval of the video data is caused to increase.

Second Embodiment

Figure 7:
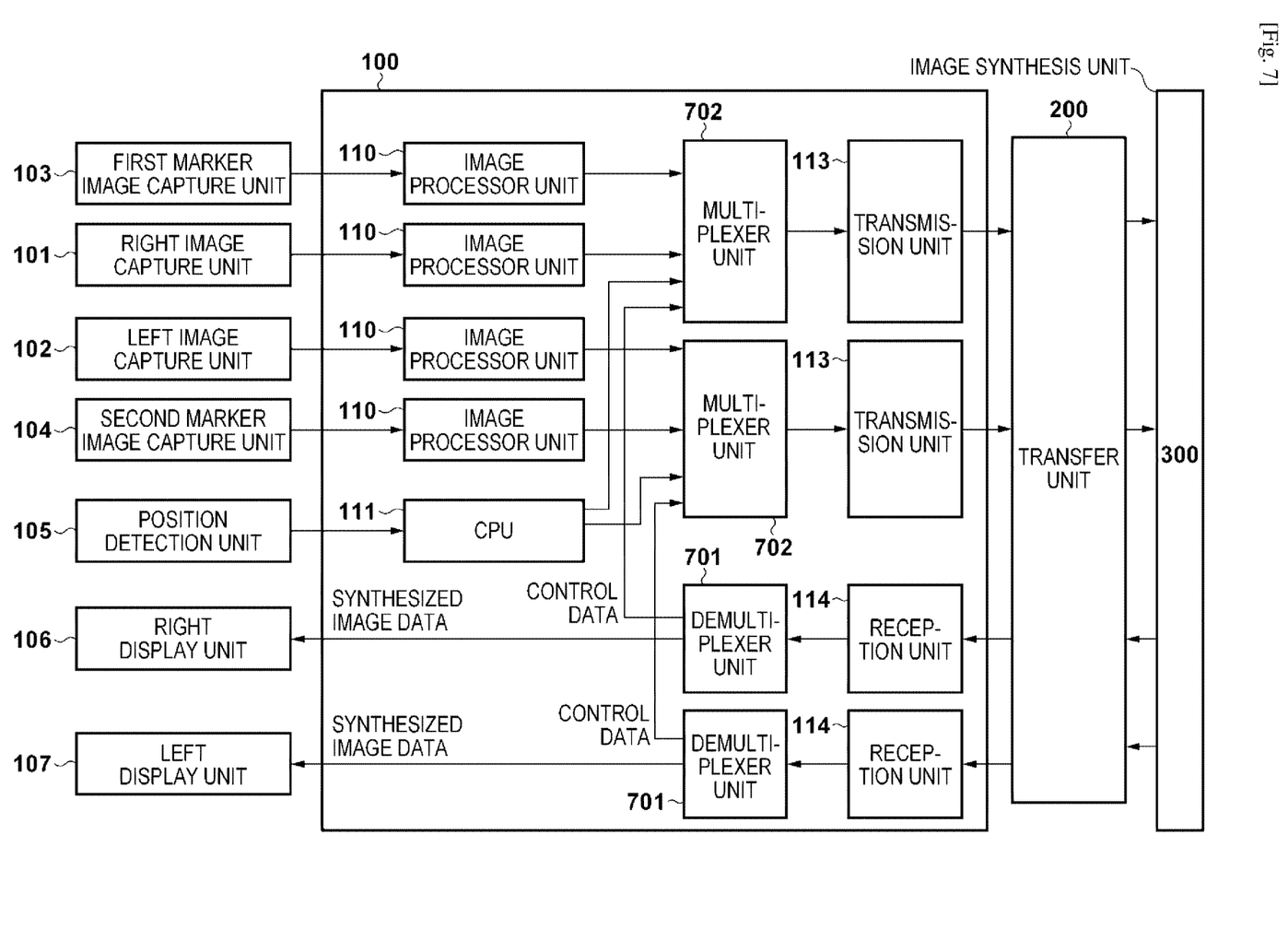
FIG. 7 is a block diagram for illustrating an example configuration of an image processing system according to a second embodiment.

FIG. 7 illustrates a configuration of the image processing system according to a second embodiment. In the present embodiment, multiplexer units 702 receive control data from an external apparatus. For example, the HMD 100 can include demultiplexer units 701 in addition to the configuration illustrated in FIG. 1. The multiplexed data from the image synthesis unit 300 is input into the demultiplexer units 701 via the reception units 114 and the transfer unit 200. The demultiplexer units 701 demultiplex the inputted multiplexed signal into the control data and the synthesized video data. Then, the video data is inputted into the display units 106 and 107 and the control data is inputted into the multiplexer units 702. The control data from the demultiplexer units 701 in addition to the communication data from the CPU 111 and the first and the second video data are inputted to the multiplexer units 702. The multiplexer units 702 generate multiplexed signal using these input signals.

The multiplexer units 702 have the same configuration as the multiplexer unit 112 illustrated in FIG. 2, other than that the control data is inputted to the mode selection unit 204, so description regarding similar configuration will be omitted.

The mode selection unit 204 sets the method of multiplexation in accordance with control data from the image synthesis unit 300 in addition to the effective interval signals of the first and second video data. By such a configuration, it becomes possible to switch the multiplexation mode by control of the image synthesis unit 300. For example, the image synthesis unit 300 does not need to change the position in which the CG is superimposed in a case that there is no change in video data (the second video data) from the marker image capture units 103 and 104 because there is no movement of the HMD 100. In the present embodiment, in such a case, the mode selection unit 204 reduces the bandwidth of the second video data and switches the multiplexation mode such that the bandwidth of the communication data is increased. By such a configuration, it becomes possible to allow for an optimization of bandwidth usage and a decrease of transmission latency of the communication data.

In the present embodiment the operation of the mode selection unit 204 will be described. Firstly, the mode selection unit 204 determines whether or not the control data acquired from the demultiplexer units 701 includes an effective signal. The mode selection unit 204 sets the method of multiplexation such that the data width of the second video in the data transmitted to the image synthesis unit 300 from the HMD 100 becomes smaller in accordance with the reception of the control data including the effective signal. For example, the mode selection unit 204 can select the first video priority mode such that the bandwidth of the second video data is reduced. Otherwise, the same processing of step S301 through step S308 is performed.

The image synthesis unit 300 can transmit a control signal to the HMD 100 if no change in the second video is determined. The image synthesis unit 300 can transmit the effective signal as control data to the HMD 100 in a case where there is a small change in the second video data, for example, or in a case where an evaluation value acquired using a pixel value difference between consecutive frame images that are included in the second video data becomes equal to or less than a threshold value, for example.

Meanwhile, in a case in which a change in the position/orientation data from the position detection unit 105 is detected, the image synthesis unit 300 can interrupt transmission of the effective signal. Even in a case in which the second video data is not input to the image synthesis unit 300, position/orientation detection data from the position detection unit 105 is transferred to the image synthesis unit 300 with low latency since the ratio of the communication data in relation to the multiplexed data is larger. For this reason, if there is movement in the HMD 100, it is possible to immediately initiate a transfer of the second video data.

As described above, in the present embodiment, the multiplexation mode is selected in accordance with the effective interval of the second video data and the first video data, and the control data from the image synthesis unit 300. For this reason, it becomes possible perform high efficiency data transfer.

Third Embodiment

In the embodiments described above, each processing unit indicated in FIG. 1 for example is realized by corresponding hardware. However, some or all of a processing units that the HMD 100 has may be realized by a computer. In the present embodiment, at least some of the processing according to each of the above described embodiments is executed by a computer.

Figure 8:
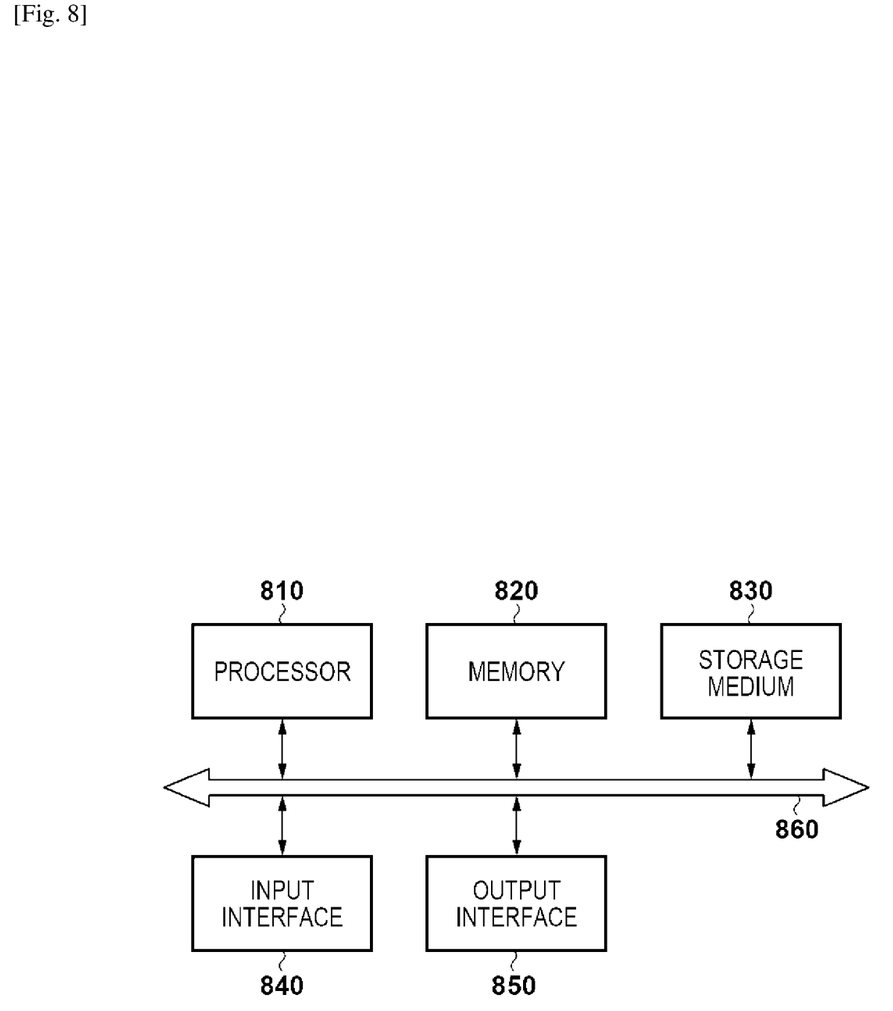
FIG. 8 is a block diagram illustrating an example of a configuration of a computer according to a third embodiment.

FIG. 8 is a figure illustrating a basic configuration of the computer. A processor 810 in FIG. 8 is a CPU for example, and controls operation of the entire computer. A memory 820 is a RAM for example, and temporarily stores programs, data, and the like. A computer-readable storage medium 830, which is a CD-ROM or a hard disk for example, stores data and programs and the like for long periods. In the present embodiment a program which realizes the functions of each unit and which is stored in the storage medium 830 is read out to the memory 820. Then, the functions of each unit are realized by the processor 810 operating in accordance with the program in the memory 820.

In FIG. 8, an input interface 840 is an interface for obtaining information from an external apparatus. Also, an output interface 850 is an interface for outputting information to an external apparatus. A bus 860 connects to each unit described above to allow an exchange of data.

The image synthesis unit 300 also can be realized using the computer illustrated in FIG. 8.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-141596, filed Jul. 15, 2015, which is hereby incorporated by reference herein in its entirety.

The invention claimed is:

1. A communication apparatus, comprising:
at least one processor executing instructions to operate as
an obtaining unit to obtain first video data comprising repetition of an effective interval in which frame image data of a first video is input and an interval in which image data is not input, second video data comprising repetition of an effective interval in which frame image data of a second video is input and an interval in which frame image data is not input, and communication data other than the video data;
a setting unit to set a method of multiplexation of the first video data, the second video data, and the communication data in accordance with the effective interval of the first video data and the effective interval of the second video data; and
a transmission unit to transmit data multiplexed in accordance with the set method of multiplexation.

2. The communication apparatus according to claim 1, wherein compared to when in the effective interval of the first video data, when not in the effective interval of the first video data, the method of multiplexation is set such that a data width that the communication data occupies in the data that is transmitted is larger.

3. The communication apparatus according to claim 1, wherein the multiplexed data that is transmitted comprising repetition of data including:
information indicating the method of multiplexation;
a synchronization signal of the first video data; and
at least one of the first video data or the communication data.

4. The communication apparatus according to claim 1, wherein the communication data includes information indicating at least one of a position or an orientation of a head mounted apparatus connected to the communication apparatus.

5. The communication apparatus according to claim 1, wherein the at least one processor further executes instructions to operate as a reception unit to receive control data from an external apparatus,
wherein the setting unit sets the method of multiplexation in accordance with the control data.

6. The communication apparatus according to claim 1, wherein the setting unit selects the method of multiplexation from the group comprising:
a normal mode selected when in the effective intervals of the first and second video data;
a first video data priority mode selected when in the effective interval of the first video data and not in the effective interval of the second video data;
a second video data priority mode selected when not in the effective interval of the first video data and in the effective interval of the second video data; and
a communication data priority mode selected when not in the effective interval of the first video data and not in the effective interval of the second video data.

7. The communication apparatus according to claim 6, wherein:
in the first video data priority mode, compared to the normal mode, multiplexing is performed such that the data width that the communication data occupies in the data that is transmitted is larger;
in the second video data priority mode, compared to the normal mode, multiplexing is performed such that the data width that the communication data occupies in the data that is transmitted is larger; and
in the communication data priority mode, compared to the normal mode, the first video data priority mode, and the second video data priority mode, multiplexing is performed such that the data width that the communication data occupies in the transmitted data is larger.

8. A communication apparatus according to claim 1, wherein in at least one period, the effective interval of the first video and the effective interval of the second video are non-aligned.

9. A communication apparatus according to claim 1, wherein the frame rate of the first video and the frame rate of the second video differ.

10. A head mounted display, comprising:
the communication apparatus according to claim 1; and
in the head mounted display the at least processor further executes instructions to operate as:
an image capture unit to capture the first video and the second video;
a reception unit to receive a synthesized video generated using the first and the second video from an image processing apparatus; and
a display to display the synthesized video,
wherein the communication apparatus transmits the multiplexed data to the image processing apparatus.

11. The head mounted display according to claim 10, wherein:
the synthesized video is an image in which a virtual image is superimposed onto the first video; and
the second video is used by the image processing apparatus for determining a position for superimposing the virtual image onto the first video.

12. The head mounted display according to claim 10,
wherein the reception unit receives multiplexed data in which the synthesized video and control data are multiplexed,
wherein the instructions are further executed to operate as a demultiplexing unit to demultiplex the control data and the synthesized video from the multiplexed data, and
the setting unit sets the method of multiplexation in accordance with the control data.

13. An image processing system, comprising:
the head mounted display according to claim 10; and
an image processing apparatus configured to receive the multiplexed data from the head mounted display, generate the synthesized video using the first and the second video, and for transmitting the synthesized video to the head mounted display.

14. The image processing system according to claim 13, wherein:
the image processing apparatus is configured to transmit a control signal to the head mounted display in a case when the second video is determined to be unchanged, and
the setting unit sets the method of multiplexation such that a data width that the second video occupies in the transmitted data is smaller in response to a reception of the control signal.

15. A communication method comprising:
obtaining first video data comprising repetition of an effective interval in which frame image data of a first video is input and an interval in which frame image data is not input, second video data comprising repetition of an effective interval in which frame image data of a second video is input and an interval in which frame image data is not input, and communication data other than the video data;
setting a method of multiplexation of the first video data, the second video data, and the communication data in accordance with the effective interval of the first video data and the effective interval of the second video data; and
transmitting data multiplexed in accordance with the set method of multiplexation.

16. A non-transitory computer-readable medium storing a program comprising an instruction for causing a computer to:
obtain first video data comprising repetition of an effective interval in which frame image data of a first video is input and an interval in which frame image data is not input, second video data comprising repetition of an effective interval in which frame image data of a second video is input and an interval in which frame image data is not input, and communication data other than the video data;
set a method of multiplexation of the first video data, the second video data, and the communication data in accordance with the effective interval of the first video data and the effective interval of the second video data; and
transmit data multiplexed in accordance with the set method of multiplexation.

17. A communication apparatus comprising:
at least one processor executing instructions to operate as
an obtaining unit to obtain first video data comprising repetition of an effective interval in which frame image data of a first video is input and an interval in which frame image data is not input, and communication data other than the video data;

a setting unit to set a method of multiplexation of the first video data and the communication data in accordance with the effective interval of the first video data; and a transmission unit to transmit data multiplexed in accordance with the set method of multiplexation, wherein compared to when in the effective interval of the first video data, when not in the effective interval of the first video data, the method of multiplexation is set such that a data width that the communication data occupies in the data that is transmitted is larger.

18. A communication method comprising:

obtaining first video data comprising repetition of an effective interval in which frame image data of a first video is input and an interval in which frame image data is not input, and communication data other than the video data;

setting a method of multiplexation of the first video data and the communication data in accordance with the effective interval of the first video data; and transmitting data multiplexed in accordance with the set method of multiplexation, wherein compared to when in the effective interval of the first video data, when not in the effective interval of the first video data, the method of multiplexation is set such that a data width that the communication data occupies in the data that is transmitted is larger.

* * * * *